US009576006B2

(12) United States Patent
Boero et al.

(10) Patent No.: US 9,576,006 B2
(45) Date of Patent: Feb. 21, 2017

(54) METHOD AND SYSTEM FOR STORING DATA IN A DATABASE

(71) Applicant: SIEMENS AKTIENGESELLSCHAFT, Munich (DE)

(72) Inventors: Andrea Boero, Genoa (IT); Ignazio Selvaggio, Genoa (IT)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 242 days.

(21) Appl. No.: 13/891,577

(22) Filed: May 10, 2013

(65) Prior Publication Data

US 2013/0304770 A1    Nov. 14, 2013

(30) Foreign Application Priority Data

May 10, 2012  (EP) .................................... 12167434

(51) Int. Cl.
*G06F 17/30* (2006.01)
(52) U.S. Cl.
CPC ......... *G06F 17/30321* (2013.01); *G06F 17/30* (2013.01)
(58) Field of Classification Search
CPC ........................... G06F 17/30321; G06F 17/30
See application file for complete search history.

(56) References Cited

U.S. PATENT DOCUMENTS

| 5,297,283 | A | * | 3/1994 | Kelly, Jr. | G06F 9/4428 718/104 |
| 5,515,531 | A | * | 5/1996 | Fujiwara | G06F 17/30433 |
| 5,548,751 | A | * | 8/1996 | Ryu et al. | |
| 5,551,024 | A | * | 8/1996 | Waters | |
| 5,727,197 | A | * | 3/1998 | Burgess et al. | |
| 5,987,472 | A | * | 11/1999 | Serafin | |
| 6,049,804 | A | * | 4/2000 | Burgess | G06F 17/30595 |
| 8,688,718 | B1 | * | 4/2014 | Dubey et al. | 707/752 |
| 2002/0010682 | A1 | * | 1/2002 | Johnson | 705/59 |

(Continued)

OTHER PUBLICATIONS

Aho A. V. et al; "Algortmy I Struktury Danych (Data structures and Algorithms)"; Wydawnictwo Helion, Glivece; pp. 55-62; ISBN: 83-7361-177-0; XP002697702, 2003—English abstract.

(Continued)

*Primary Examiner* — Shiow-Jy Fan
(74) *Attorney, Agent, or Firm* — Laurence Greenberg; Werner Stemer; Ralph Locher

(57) ABSTRACT

A database has a main table and an auxiliary table. Data are stored by: dividing the data into a sequence of segments each having a size smaller than a predetermined threshold; storing a first segment into a first field of a record of the main table; storing an index indexing the data into a second field of the record of the main table; storing the other segments into first fields of corresponding records of the auxiliary table; generating indexes associated to the other segments and storing each index into a second field of the record of the auxiliary table storing the associated segment of the sequence and also in a third field of the record of the auxiliary table storing a preceding segment in the sequence. A third record of the main table stores the index of a first segment of the sequence which is stored in the auxiliary table.

12 Claims, 7 Drawing Sheets

(56) References Cited

U.S. PATENT DOCUMENTS

2008/0222104 A1* 9/2008 Stewart ............ G06F 17/30321

OTHER PUBLICATIONS

Tyler Oli; "Represent Ordering in a Relational Database"; Internet: Internet: URL:http://web.archive.org/ web/20081023170116/http://stackoverflow.com/questions/21388/reresent-ordering-in-a-relational-database; XP002697704, 2008, Sep. 24, 2008.
"Linked list"; Internet: URL:https://en.wikipedia.org/w/index.php?title=Linked_list&oldid=488624981; XP02697701, Apr. 22, 2012.
BPANULLA; "How to design a database for storing a sorted list?"; Internet: URL:http://web.archive.org/web.20120105153237/http://dba.stackexchange.com/questions/5683/how-to-design-a-database-for-storing-a-sorted-list; XP002697703, 2011, Sep. 13, 2011.

* cited by examiner

FIG 1A

100 — Main Table

| VALUE | ID | INDEX |
|---|---|---|
| AAA | 1 | 1239 |
| BBB | 2 | 5748 |
| CCC | 3 | NULL |
| DDD | 4 | 6585 |
| EEE | 5 | 21334 |
| FFF | 6 | 3323 |
| GGG | 7 | 2213 |
| HHH | 8 | 2233 |
| III | 9 | 2345 |
| ... | | |

110 — Auxiliary Table

| VALUE | INDEX | NEXT_INDEX |
|---|---|---|
| JJJ | 21334 | 9684 |
| KKK | 3323 | NULL |
| LLL | 9684 | 5525 |
| MMM | 5525 | 4758 |
| NNN | 1239 | 9494 |
| OOO | 4758 | NULL |
| PPP | 9494 | NULL |
| QQQ | 3654 | NULL |
| RRR | 3741 | 3654 |
| ... | | |

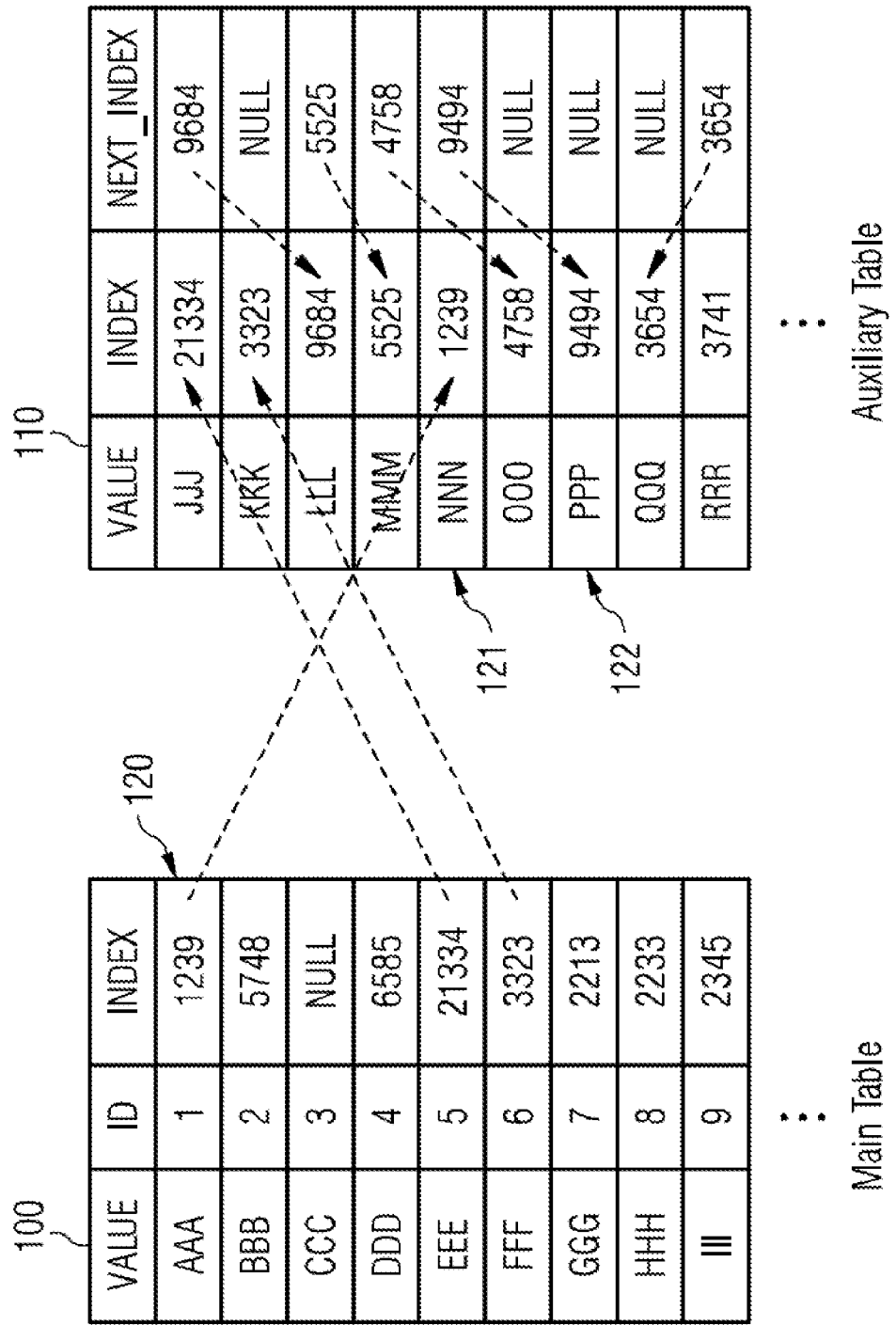

| VALUE | ID | INDEX | PK | TYPE | DATE |
|---|---|---|---|---|---|
| AAA | 1 | 1239 | ... | ... | ... |
| BBB | 2 | 5748 | ... | ... | ... |
| CCC | 3 | NULL | ... | ... | ... |
| DDD | 4 | 6585 | ... | ... | ... |
| EEE | 5 | 21334 | ... | ... | ... |
| FFF | 6 | 3323 | ... | ... | ... |
| GGG | 7 | 2213 | ... | ... | ... |
| HHH | 8 | 2233 | ... | ... | ... |
| III | 9 | 2345 | ... | ... | ... |

⋮

Main Table

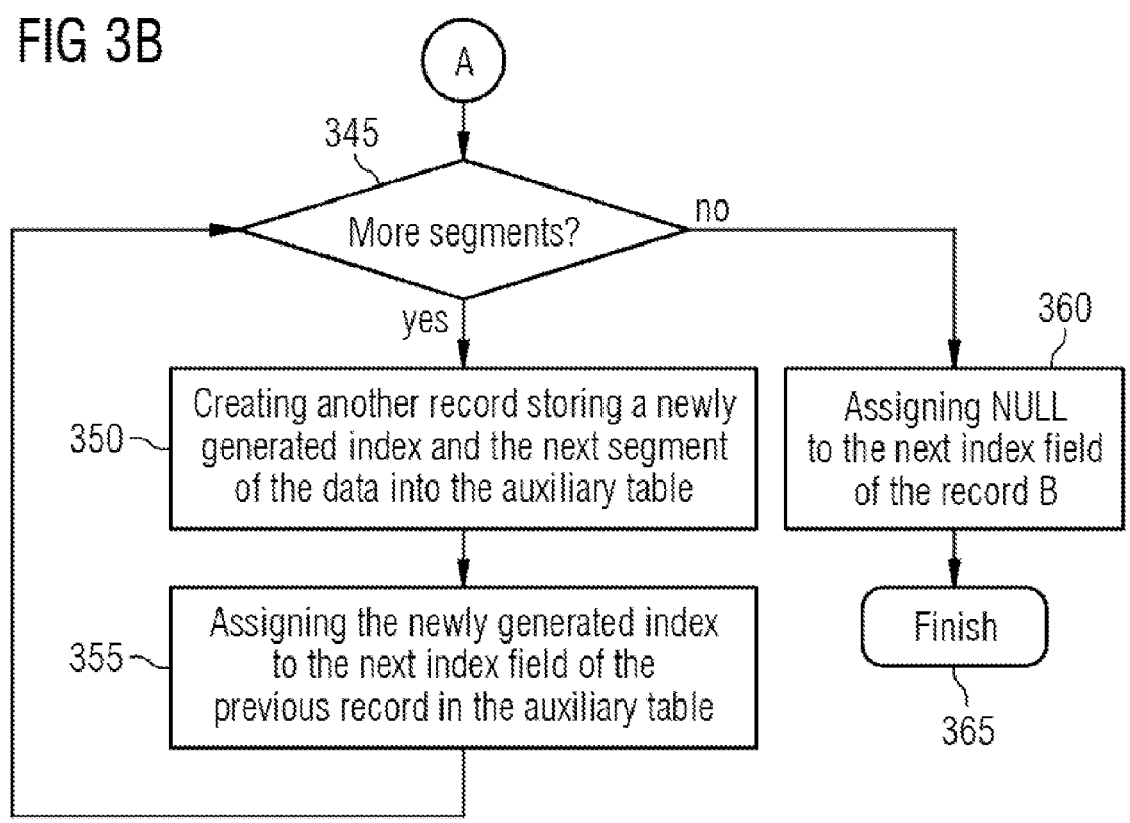

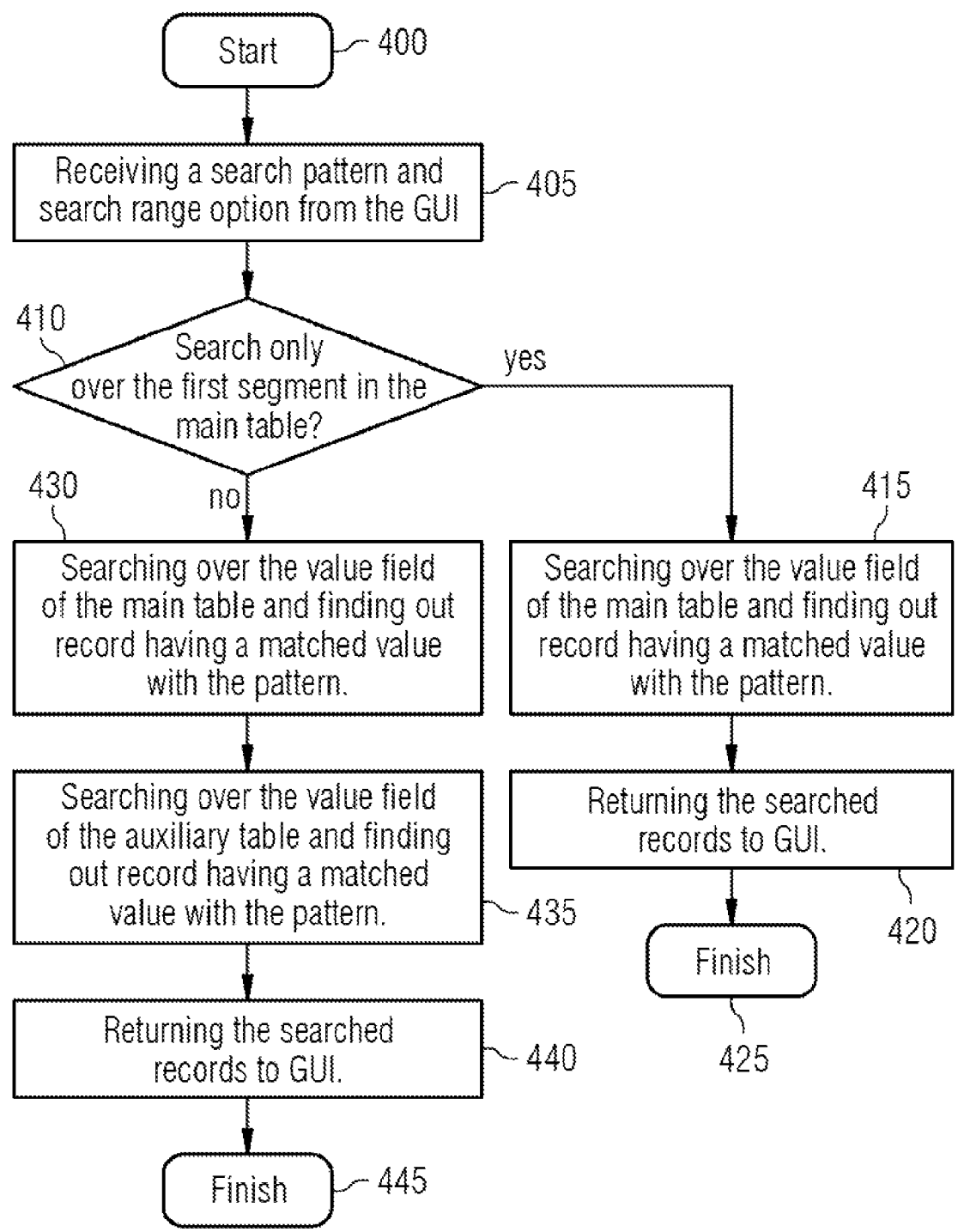

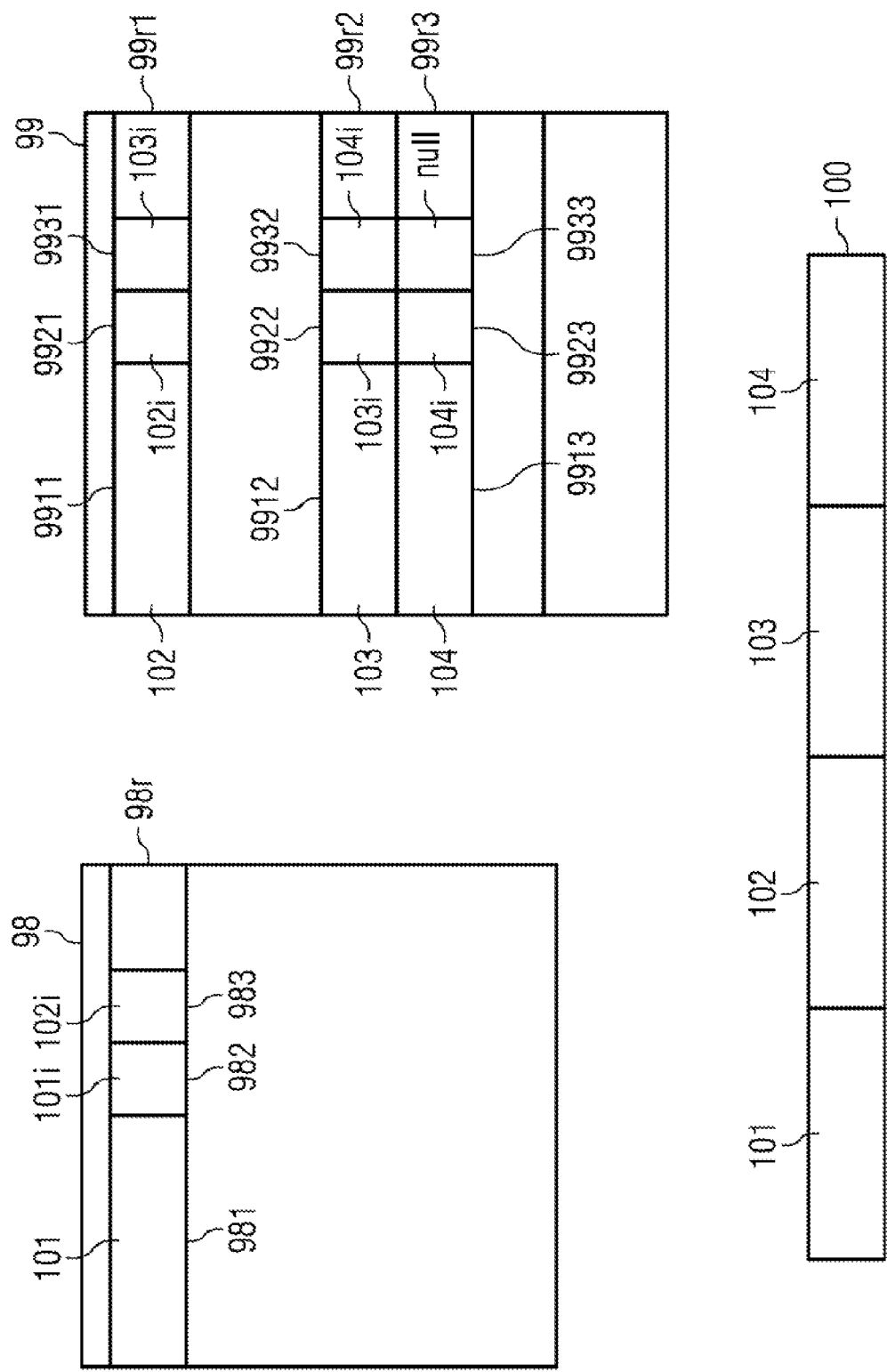

METHOD AND SYSTEM FOR STORING DATA IN A DATABASE

CROSS-REFERENCE TO RELATED APPLICATION

This application claims the priority, under 35 U.S.C. §119, of European patent application EP 12 167 434.5, filed May 10, 2012; the prior application is herewith incorporated by reference in its entirety.

BACKGROUND OF THE INVENTION

Field of the Invention

The present invention relates to a method and to a system for storing data of great size in a database. More particularly, the invention relates to a method of the type described above, wherein data of great size are divided into segments, wherein each segment have a size lower than a predetermined threshold.

A prior art method and system for storing data in a database structure, for example, in the database structure of an SQL (structure query language) server, includes storing value in the fields of a table having several records. The fields may be of various data types such as char, varchar, nvarchar, decimal, integer, real, and the like. Each data type has its own size which can be predetermined or variable. For example, 'varchar', 'nvarchar' data type is adapted to store value with variable size while 'char', 'decimal', 'integer' data type stores values with a fixed size.

In this respect, a database management system (DBMS) allocates memory space of non-constant size for the fields having the data-type 'nvarchar'. In some known implementation, for avoiding memory waste caused by using field with constant size, the database management system allocates dynamically different size of the memory space, depending on the size of actual data to be stored, for instance depending on an application writing and reading the database.

However, even if 'nvarchar(MAX)' supports data of great size, the performance for managing such data, e.g. storing, retrieving, searching, the data in the fields of the database is low because they are threaded as a single block of data. For example, it is not possible to index directly different portions of the data stored in the table of the database, for example for searching a specific portion of the data but the entire data is read from the table and then the content is searched or inspected.

In other words, all the data are retrieved from the table of the database first, and a search may be executed only on the data retrieved in block. Especially in some applications, this is undesirable since crucial information may be stored at the beginning of the whole data or at the end or at a predetermined portion, and would be better to perform the search only over a portion instead of reading the whole data in the field.

This drawback decreases the performance of many applications, for example the graphical user interface (GUI) supporting pagination of data. These GUI are programmed to show the user only a first portion of data at first; the GUI is programmed to show a second portion of data only if the user requests further portions of data which follows the first one. However, since the data of great size is stored in one field having the 'nvarchar(MAX)' data type, all the data stored in the database are retrieved by the application at a time, e.g. using sql-query such as select, even if only a small portion of the whole data is actually needed, for each display in the GUI. This known method does not provide a good performance in the data retrieval and display, and also require to allocate great memory space in the GUI for storing all data temporarily, thus duplicating the memory usage in a computer system.

SUMMARY OF THE INVENTION

It is accordingly an object of the invention to provide a method and a system which overcome the above-mentioned disadvantages of the heretofore-known devices and methods of this general type and which provide for storing data of great size and which allow to improve the performance in the operations of searching, retrieving, displaying, reading and writing the data, thus overcoming various limitations that currently affect the prior art method and system.

With the foregoing and other objects in view there is provided, in accordance with the invention, a method of storing data in a database, the database having a main table and an auxiliary table, the method which comprises:

dividing the data into a sequence of segments each having a size smaller than a predetermined threshold, the sequence of segments including a first segment and further segments;

storing the first segment of the sequence in a first field of a given record of the main table of the database;

storing an index indexing the data in a second field of the given record;

storing the further segments of the sequence in first fields of corresponding records of the auxiliary table of the database;

generating further indexes associated with the further segments and storing each further index thus generated in a second field of a record of the auxiliary table that stores the associated segment of the sequence and also in a third field of the record of the auxiliary table that stores a preceding segment in the sequence; and storing, in a third field of the given record of the main table, the index of a first segment of the further segments of the sequence that is stored in the auxiliary table.

In other words, the technical problem described above is solved by a method for storing data of great size in a database, comprising dividing the data into a sequence of segments, each segment having a size lower than a predetermined threshold; storing a first segment of the sequence into a first field of a record of a main table of the database and storing an index indexing the data of great size into a second field of the record; storing all the other segments of the sequence into first fields of corresponding records of an auxiliary table of the database and generating indexes associated to the other segments; storing each generated index into a second field of the record of the auxiliary table which stores the associated segment of the sequence and storing such generated index also in a third field of the record of the auxiliary table which stores a previous segment of the sequence; storing in a third record of the main table the index of a first segment of the sequence stored in the auxiliary table. Advantageously, according to the method of the present invention, all the segments of the sequence corresponding to data of great size are linked starting from a first ands single segment which is stored in the main table. The starting portion of the data of great size may be retrieved, read, written, searched and displayed executing a query on the main table which reads the first field, this last having a predetermined and small size with respect to the size of the whole data. Further operations of retrieving, reading, writing, searching and displaying may be executed separately on different records of the auxiliary table, i.e. on the fields of predetermined and smaller size with respect to the size of the whole data.

In accordance with an added feature of the invention, the index indexing the data of great size into a second field of the record of the main table also indexes the first segment in such record of the main table. In other words, such index is used to refer as an access point to the start portion of the whole data and to refer to the corresponding first segment.

The indexes stored in the main and in the auxiliary tables are advantageously used for reconstructing the order of the sequence of segments which correspond to the data. Thus, the order of the records in the auxiliary table does not necessarily correspond to the order of the segments in the sequence.

In this respect, "great size" means data with information in the GB (Gigabyte) range, or from one to many GB. However, the invention is not limited to a predetermined size of the data to be divided but it is applicable in each case wherein it is preferable to direct and separate access or load specific portions of data to be read instead of single loading the whole data at a time.

In accordance with an additional feature of the invention, the method for managing data in a database server comprises dividing data into a plurality of segments, if the data has a length greater than a predetermined value, storing a first segment of the plurality of segments into a first field of the record of the main table, storing the ID corresponding to the data into a second field of the record of the main table, storing a second segment of the plurality of segments into a first field of a first record of an auxiliary table, generating an index corresponding to the second segment, storing the generated index into a third field of the record of the main table and into a second field of the first record of the auxiliary table.

Advantageously, the improved method of the invention reduces the internal memory fragmentation by managing the data allocation dividing the data into segments and using a main table and an auxiliary table.

The method further comprises storing a third segment of the plurality of segments into the first field of a second record of the auxiliary table, generating an index corresponding to the third segment, storing the generated index into the second field of the second record of the auxiliary table and in a third field of the first record of the auxiliary table. In this way, the data of great size are stored distributed in a plurality of segments, and each segment can be searched based on the corresponding index. This structure of the database thus supports index based search.

The data may be divided into the plurality of segments so that each segment of the plurality of segments except the last segment has a length of the predetermined value. When the length of a specific field is constant, it is easier for the database server to store records into memory in an optimized way such that the search for the record or the retrieve for the record has a better performance.

In accordance with another feature of the invention, the method further comprises storing a NULL index into the third field of a record of the auxiliary table if the segment stored in the record is the last one. The method may further comprise storing additional information associated with the data into at least one additional field of the record of the main table. By storing NULL index to the record which stores the last segment of the data, searching the end of the segments is really fast.

In accordance with a further feature of the invention, retrieving data from the main table includes receiving an ID for retrieving the data corresponding to the ID from a user, searching a record including the ID in the main table, extracting the first segment of the data stored in the first field of the searched record, extracting a first index stored in the third field of the searched record, searching the rest of the segments of the data in the auxiliary table based on the extracted first index. Advantageously, the method improves the performance for retrieving data also for applications supporting pagination for showing the data in GUI. For example, an application sends the first segment of the data to the GUI for display, after querying the first field in the main table, and query data in the auxiliary table only on user request, for example, if the user select a 'next page' or 'next section' button.

Furthermore, the searching the other of the segments of the data in the auxiliary table may comprise searching a record whose second field contains the extracted first index in the auxiliary table, extracting a second segment of the data from the first field of the searched record of the auxiliary table, extracting a second index from the third field of the searched record of the auxiliary table, searching another segment of the data in the auxiliary table based on the second index. Alternatively, the search can be performed based on the ID of data and the index of the segment.

In another aspect of the invention, retrieving the data from the main table may comprise receiving a pattern whose length is less than the predetermined value from a GUI (graphical user interface), searching the first field of the main table whose value matches the pattern, returning the matched record of the main table to the GUI. The pattern may be raw text or regular expression, but it is not limiting thereto. For instance, the patter is a string of character to be searched, having a size lower or equal to a size of the first field in the main table; advantageously, the character string is searched only in the first field of the record of main table, corresponding to the start portion of the data. In one embodiment, the search is made comparing the pattern or character string to the content of the first field, and checking if the pattern or character string is included or not in the first field.

In an aspect of the invention, the pattern or character string may be searched also in the auxiliary table, checking if the pattern or character string is included or not in the first fields of the records of the auxiliary table corresponding to the segments of the data.

When significant information is mostly stored at the beginning part of the data, e.g. the first segment of the data, in the application, the speed of search can be improved significantly. For example, the GUI may provide two options for the search, the first option may be to searching only the beginning portion of the data, and second option may be searching the whole data. Depending on the option selected by the user, the GUI and the DBMS can perform proper search action on the main table and/or the auxiliary table.

In another aspect of the invention, the method further comprises receiving a segment index number from the GUI, iterating the main table or the auxiliary table to search a corresponding segment of the data based on the segment index number, returning a searched segment of data to the GUI, and displaying the searched segment on a display device by the GUI.

With the above and other objects in view there is also provided, in accordance with the invention, a computer system, comprising:

a database for storing data in non-transitory form, the data being divided into a sequence of segments including a first segment and a second segment;

the database including a main table with at least one record and an auxiliary table including at least one record;

the at least one record of the main table including a first field storing the first segment of the sequence, a second field storing a corresponding ID of the data, and a third field storing an index corresponding to the second segment of the sequence, wherein the second segment is stored in the auxiliary table; and the at least one record of the auxiliary table including a first field storing the second segment, a second field storing the index of the second segment, and a third field storing an index of a next segment in the sequence that is stored in the auxiliary table.

In accordance with a concomitant feature of the invention, the auxiliary table further comprises another record storing a third segment of the plurality of segments as a first field, storing an index indicating the third segment as a second field, and storing an index of a next segment of the sequence as a third field thereof.

Other features which are considered as characteristic for the invention are set forth in the appended claims.

Although the invention is illustrated and described herein as embodied in a method and system for storing data in a database, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL VIEWS OF THE DRAWING

FIG. 1A schematically shows the main table and the auxiliary table of the database according to the invention;

FIG. 1B schematically shows the main table and the auxiliary table of the database illustrating the relationship among each record;

FIG. 2 schematically shows the main table having additional fields for storing additional information;

FIG. 3A and FIG. 3B shows a flow chart of storing data into the database according to the invention;

FIG. 4 shows a flow chart illustrating the retrieval of data from the database according to the invention; and FIG. 5 schematically shows in a different view the main table and the auxiliary table of the database according to the invention.

DETAILED DESCRIPTION OF THE INVENTION

Figure 3A:
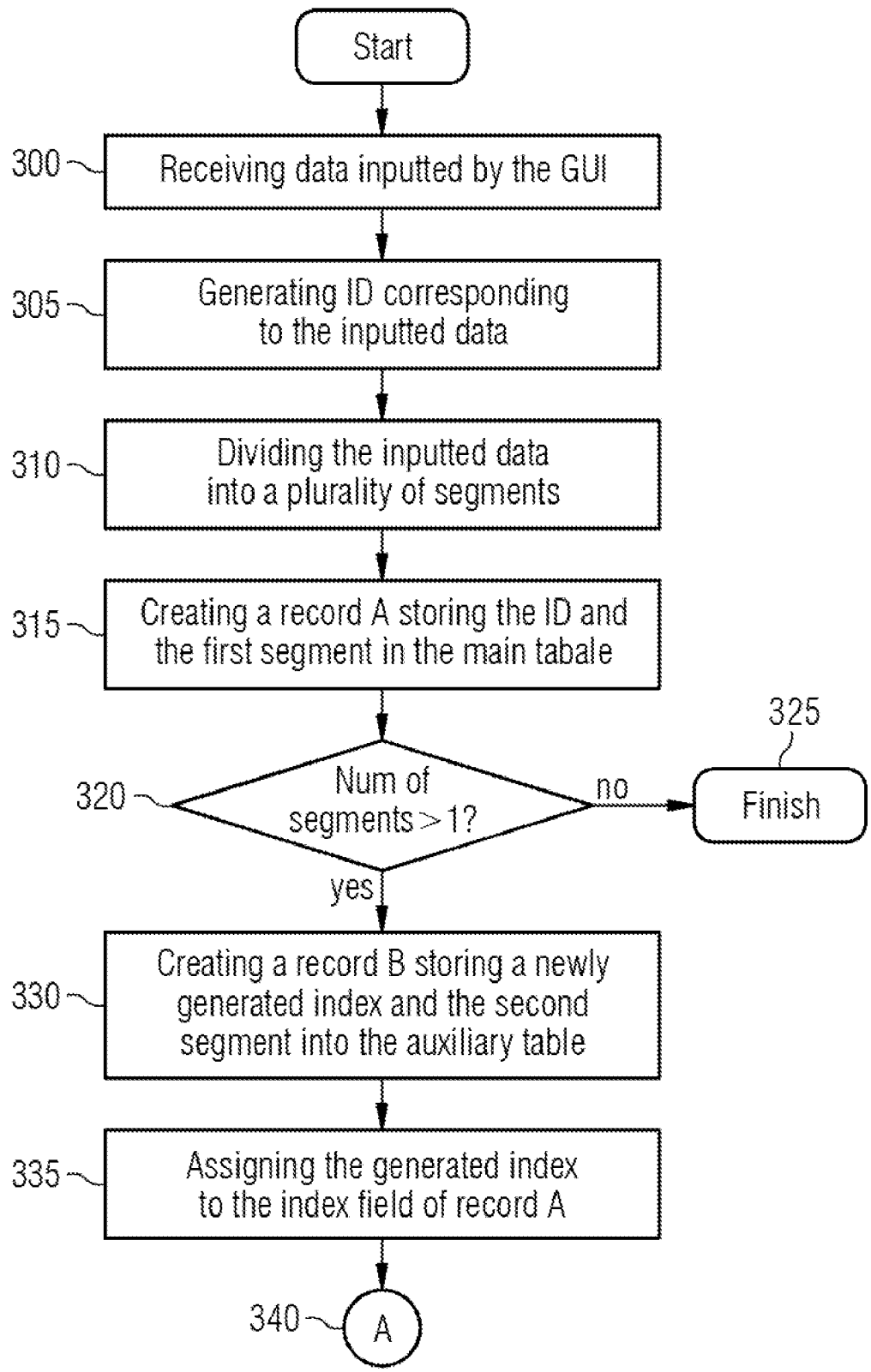

Referring now to the figures of the drawing in detail and first, particularly, to FIG. 1A thereof, there is shown a schematic of a main table and an auxiliary table of a database according to the invention. The main table 100 is provided for storing a beginning portion of a specific data, and the auxiliary table 110 is provided for storing the other portion of the specific data. More particularly, data to be stored are divided into a plurality of segments, wherein one segment is stored into the main table while the other segments are stored into the auxiliary table.

To explain the structure in more detail, each of the main table 100 and the auxiliary table 110 includes at least one record. The record of the main table 100 comprises three fields, i.e. a first field, a second field, and a third field. The first field stores the first segment of the plurality of segments of the specific data. Each segment has a predetermined length or size. In an aspect of the invention, if the first field has a data type capable of storing data with variable length, the segment lengths may vary; for example the first segment may be greater than the other segments. In another example, the first segment stored in the main table has a first length, and the other segments stored in the auxiliary table have a different length.

The second field of the main table 100 stores a corresponding ID of the specific data. The ID can be any symbol which is used for distinguishing the specific record from the other records, for instance a number with several digits or a group of alphanumeric letters. The ID is unique to each record stored in the main table 100.

The third field of the main table 100 stores an index corresponding to a second segment of the specific data stored in the auxiliary table 110. The index is a pointer which indicates the next segment of the specific data. The index of the main table 100 can be any symbol which can be used for identifying the next segments record stored in the auxiliary table 110. Preferably, the index is a randomly generated unique integer. The same value is stored in a second field of the auxiliary table 110.

The record of the auxiliary table 110 comprises three fields, i.e. a first field, a second field, and a third field. The first field may store the non-first segment of the plurality of segments of the specific data. Each segment preferably has a constant length. Alternatively, the segment length vary; for example, if the first field of the auxiliary table has a data type able to store variable length of data, the corresponding segment may have a different length.

The second field of the auxiliary table 110 stores an index of the specific segment of the specific data. The index can be any symbol which can be used for identifying the specific record from the other records in the auxiliary table, for instance a number with several digits or a group of alphanumeric letters. The index is uniquely assigned to each record stored in the auxiliary table. This index field can be searched for finding the non-first segment of a specific data after retrieving the index value from the third field of the main table 100 of the specific data.

The third field of the auxiliary table 110 may store a next index corresponding to the next segment of the specific data stored in the auxiliary table 110. The index a pointer which indicates the next segment of the specific data following the segment stored in the current record. The next index of the auxiliary table 110 can store any symbol which is used for identifying the next segments record stored in the auxiliary table 110. Preferably, the next index may be a randomly generated unique integer. Alternatively, the next index may be a unique integer generated based on specific rule.

Referring now to FIG. 1B, which explains the database structure in more detail, there is shown a schematic of the main table and the auxiliary table of the database with relationships between each record.

For brevity of explanation, hereinafter, the first field of the main table 100 is indicated as VALUE field, the second field of the main table 100 is indicated as ID field, the third field of the main table 100 is indicated as INDEX field. Similarly, the first field of the auxiliary table 110 is called as VALUE field, the second field of the auxiliary table 110 is called as INDEX field, and the third field of the auxiliary table 110 is called as NEXT_INDEX field. Dashed arrows are drawn in the FIG. 1B in order to illustrate the relationship among the records stored in the main table and the auxiliary table.

A first record 120 having a value of 1 in the ID field stores 1239 in the INDEX field. A second record 121 stores 1239 in its INDEX field of the auxiliary table 110. Accordingly, the first record 120 stores a first segment of the whole data, i.e. AAA, while the second record 121 stores a second segment of the whole data, i.e. NNN. Each of the first and second record is linked by storing the same value 1239 in its INDEX field. For simplicity of explanation, VALUE fields of all the records in the Fig. have 3 alphabet letters. However, the size of the VALUE field is variable and the VALUE field may store any kinds of data supported by the database system.

The second record 121 stores 9494 in its NEXT_INDEX field. A third record 122 stores 9494 in its INDEX field, and NULL value in its NEXT_INDEX field. The NULL value in the NEXT_INDEX field is associated to the record storing the last segment of the data. Preferably, NULL is 0. The original information, e.g. inputted data by GUI, which should be stored in the database is "AAANNNPPP". When the database management system (DBMS) receives a request to store the data "AAANNNPPP" with the corresponding ID 1, it divides the data "AAANNNPPP" into three segments, i.e. "AAA", "NNN", "PPP". DBMS creates the first record storing the first segment of the original information, i.e. "AAA" on its VALUE field, 1 in ID field. Then, DBMS generates an index '1239' for pointing to the next segment of the original data. The index can be generated randomly or by a predetermined rule, and the newly generated index does not overlap with the previously generated index. In this case, DBMS stores the newly generated index '1239' in the INDEX field of the first record 120.

Then, the DBMS creates the second record 121 in the auxiliary table 110. The second segment of the original information, i.e. "NNN", is stored in the VALUE field of the second record 121 of the auxiliary table 110. The index value '1239' is then stored in the INDEX field of the second record 121 of the auxiliary table 110. Due to the same value '1239' stored in the INDEX field of the first record 120 and in the INDEX field of the second record 121, the DBMS system can restore the original information by tracing those indexes.

Afterwards, the DBMS creates the third record 122 in the auxiliary table 110. The third segment of the original information, i.e. "PPP", is stored in the VALUE field of the third record 122 of the auxiliary table 110. The index value '9494' is then generated by the DBMS, and the '9494' is stored in the NEXT_INDEX field of the second record 121 and in the INDEX field of the third record 122. The third record 122 is the last record storing the last segment of the original information, so the NEXT_INDEX field of the third record 122 is filled with NULL value.

In the example, the DBMS divides the original information so that each segment of the original information has 3 letters. However, the length of data stored in VALUE field can be varied depending on the specific implementation. Preferably, the length of the data segment can be 500 characters.

Meanwhile, when the DBMS receives a data retrieve request from the user, the DBMS can identify the relationship between the records stored in the main table and the auxiliary table by referring to the INDEX field of the main table and the auxiliary table. Then, the DBMS can concatenate the data "AAA" in the VALUE field of the first record 120 of the main table 100 with the data NNN in the VALUE field of the second record 121 of the auxiliary table 110.

The DBMS identifies the relationship between the second record 121 and the third record 122 by referring to the NEXT_INDEX field of the second record 121 and the INDEX field of the third record 122, both of which store the value of '9494'. After searching the third record 122 in the auxiliary table 110, the DBMS can establish the original information by concatenating all segments distributedly stored in different records. In other words, the original information "AAANNNPPP" is restored by concatenating "AAA" of the first record 120, "NNN" of the second record 121, and "PPP" of the third record 122 sequentially.

The scheme according to the invention can be used for storing information of great size in a database server while avoiding the use of nvarchar(MAX) data type which can cause internal memory fragmentation of the database server, which degrades the performance of the database. Therefore, the scheme according to the invention improves the performance of the database server. Moreover, each segment of a specific data can be searched based on the corresponding index, so the scheme supports index based search. In case pattern search only for the beginning part of each data is required, the scheme can increase the performance since it is enough to search the VALUE field of the main table.

Furthermore, the scheme can support pagination for GUI in itself. If each page of the whole data is stored in each segment of the whole data as explained, the GUI can request one page at a time, and the DBMS can return the requested segment of the whole data without retrieving the whole big data from the database at once. This improves the performance of the application.

FIG. 2 schematically shows the main table having additional fields for storing additional information.

The main table 100 can have at least one additional field except the VALUE field, the ID field, and the INDEX field to store further additional information related to the data. The additional fields shown in FIG. 2 are PK, TYPE, and DATE. The auxiliary table may also have additional fields to store further information.

FIG. 3A and FIG. 3B shows a flow chart for storing data into the database according to the invention. The DBMS receives data inputted by the GUI at step 300. The DBMS generates ID corresponding to the inputted data at step 305 and divides the inputted data into a plurality of segments at step 310. The length of each segment may be constant except that of the last segment. Alternatively, the length of the first segment may be different from those of the other segments since the first segment is stored in the main table and the other segments are stored in the auxiliary table.

At step 315, the DBMS creates a record A storing the ID on its second field and the first segment of the inputted data on its first field. Then, the DBMS checks the number of the segments and if the number of the segments is only 1, it finishes at step 325. Otherwise, the DBMS creates a record B storing a newly generated index on its second field and the second segment on its first field into the auxiliary table at step 330. The DBMS assigns the generated index to the third field, i.e. index field of record A at step 335.

With reference to FIG. 3B, the DBMS checks whether more segments of the original data remain at step 345. If no more segments to store in the database remain, then the DBMS assigns NULL value to the next index field, i.e. third field, of the record B at step 360, and finishes its operation at step 365. If one or more segments to store in the database remain, the DMBS creates another record storing a newly generated index in its second field and the next segment of the data in its first field, and stores the record into the auxiliary table at step 350. Then, the DMBS assigns the newly generated index to the next index field, i.e. third field, of the previous record in the auxiliary table.

FIG. 4 shows a flow chart of retrieving data from the database according to the invention. In FIG. 4, a method of search using pattern, e.g. text, regular expression, is explained.

At first, the DBMS receives a search pattern and search range option from the GUI at step 405. Search range option can be searching the entire data or searching only the first segment in the main table, and can be selected by user through GUI. Then, the DBMS checks the search range option at step 410. If the option is chose as searching only the first segment in the main table, the DBMS searches over the value field, i.e. first field, of the main table and looks for record having a value matching with the pattern at step 415. Then, the DBMS returns the searched records to GUI at step 420.

If the option is chosen as searching the entire data, the DBMS searches over the value field, i.e. first field, of the main table and looks for records having a matched value with the pattern at step 430. Then, the DBMS searches over the value field, i.e. first field, of the auxiliary table and looks for records having a value matching with the pattern at step 435. Then, the DMBS returns the searched records to GUI at step 440, and finishes its operation at step 445.

With reference to FIG. 5, the method for storing data in a database according to the present invention is further described. In such Fig. data to be stored are indicated with 1000, the record in the main table is indicated with 98r and the records in the auxiliary table with 99r1, 99r2, 99r3. Moreover, the field for storing the value in the main table is indicated with 981 and in the auxiliary table with 9911, 9912, 9913. At last, the field for storing the index of data in the main table is indicated with 982 and the field for storing the index of the next record with 983, while the field for storing the indexes of data in the auxiliary table are indicated with 9921, 9922, 9923 and the field for storing the index to the next records with 9931, 9932, 9933. In this figure, the reference numbers have been changed and some reference number have been added only to describe in better detail the invention but the features already disclosed with reference to drawings 1-4 apply also to FIG. 5.

The data 1000 having a great size is divided into a sequence of segments 101, 102, 103, 104, each segment having a size lower than a predetermined threshold. A first segment 101 of the sequence 101, 102, 103, 104 is stored into the first field 981 of the record 98r of the main table 98 of the database and an index 1011 indexing the data 1000 is stored into the second field 982 of the record 98r. The other segments 102, 103, 104 of the sequence 101, 102, 103, 104 are stored into the first fields 9911, 9912, 9913 of corresponding records 99r1, 99r2, 99r3 of the auxiliary table 99 of the database; indexes 102i, 103i, 104i associated to such other segments 102, 103, 104 are generated and stored in the auxiliary table. More particularly, each generated index 103i is stored into a second field 9922 of the record 99r2 of the auxiliary table which stores the associated segment 103 of the sequence 101, 102, 103, 104 and also in a third field 9931 of the record 99r1 of the auxiliary table which stores a previous segment 102 in the sequence. A third record 983 of the main table stores the index 102i of a first segment 102 of the sequence 101, 102, 103, 104 which is stored in the auxiliary table. Such index 102i, is used to point to the segment 102 of the sequence when a data retrieve is requested, i.e. when the segment 101 is read, in order to the link segment 101 with segment 102. Similarly, the index 103i, is used to point the segment 103 which follows segment 102 in the auxiliary table.

Meanwhile, the database according to the invention can be utilized in a different way based on the specific purpose. In one example, the DBMS can support pagination to the GUI or other application. That is to say, if each page of the whole data is stored in each segment of the whole data, the GUI can request one page at a time and show it on the display one by one. And, the DBMS can return only the requested segment of the whole data without retrieving the whole big data from the database at once.

Many of the cutting-edge social network services (SNSs) such as Facebook, Twitter, and the like require this pagination functionality because the GUI of those SNSs show only the first segment of the text on the screen at first if the total length of the text exceeds a specific limit. When the user clicks the button saying, for instance, "more", "next", "next page", "next text" and the like, then the GUI requests the rest segments to the DBMS and the DBMS searches the rest data through the INDEX and NEXT_INDEX field of the main table and auxiliary table.

Advantageously, the scheme according to the invention can be used for storing data of big size in a database server while avoiding the use of nvarchar(MAX) data type, and it improves the performance of the database server. Moreover, each segment of a specific data can be searched based on the corresponding index, so the scheme supports 'index based search'. If pattern search only for the beginning part, i.e. first segment, of each data is required, the scheme can increase the performance since it is enough to search the VALUE field of the main table.

Furthermore, the scheme can support pagination for GUI in itself. If each page of the whole data is stored in each segment of the whole data as explained, the GUI can request one page at a time, and the DBMS can return the requested segment of the whole data without retrieving the whole big data from the database at once. This improves the performance of the application.

The invention claimed is:

1. A method of storing data in a database in a memory, the database having a main table and an auxiliary table, the method which comprises providing:

a memory and a database management system for allocating memory space in the memory, the database management system configured for storing the data in the database without using an nvarchar(MAX) data type by performing the following steps:

dividing the data into a sequence of segments each having a size smaller than a predetermined threshold, the sequence of segments including a first segment and further segments;

storing the first segment of the sequence in a first field of a given record of the main table of the database;

storing an index indexing the data in a second field of the given record;

storing the further segments of the sequence in first fields of corresponding records of the auxiliary table of the database;

generating further indexes associated with the further segments and storing each further index thus generated in a second field of a record of the auxiliary table that stores the associated segment of the sequence and also in a third field of the record of the auxiliary table that stores a preceding segment in the sequence; and storing, in a third field of the given record of the main table, the index of a first segment of the further segments of the sequence that is stored in the auxiliary table, wherein the index in the third field of the given record of the main table is identical to the index in the second field of the record in the auxiliary table.

2. The method according to claim 1, wherein the dividing step comprises dividing the sequence into segments of equal, predetermined size, except for a last one of the segments having a smaller size.

3. The method according to claim 1, further comprising: storing a NULL index into the third field of the record of the auxiliary table if the segment stored in the record is a last segment of the sequence.

4. The method according to claim 1, further comprising: storing additional information associated with the data into at least one additional field of the record of the main table.

5. The method according to claim 1, wherein retrieving the data from the main table comprises:
   receiving an ID indexing the data, searching the record including the ID in the main table, extracting the first segment of the data stored in the first field of the searched record, extracting the index stored in the third field of the searched record, searching a following segment in the sequence in the auxiliary table based on the index extracted from the main table.

6. The method according to claim 5, wherein searching the further segments of the data in the auxiliary table comprises:
   searching the record whose second field contains the index extracted from the main table;
   extracting a segment of the data from the first field of the searched record in the auxiliary table;
   extracting the index from the third field of the searched record of the auxiliary table; and
   searching the other segments of the sequence in the auxiliary table starting from the extracted index.

7. The method according to claim 1, which comprises retrieving the data from the main table by:
   receiving a pattern whose length is less than the predetermined value from a graphical user interface;
   searching the first field of the main table whose value matches the pattern; and
   returning the matched record of the main table to the GUI.

8. The method according to claim 7, which further comprises: receiving a segment index number from the GUI, iterating the main table or the auxiliary table to search a corresponding segment of the data based on the segment index number, returning a searched segment of data to the GUI, and displaying the searched segment on a display device by the GUI.

9. The method according to claim 1, wherein the index is a randomly generated unique integer.

10. A computer system, comprising:
    a memory with a database for storing data in non-transitory form, the data being divided into a sequence of segments including a first segment and a second segment; and
    a database management system for allocating memory space in the memory, said database management system configured for storing the data in the database without using an nvarchar(MAX) data type;
    said database including a main table with at least one record and an auxiliary table including at least one record;
    the at least one record of the main table including a first field storing the first segment of the sequence, a second field storing a corresponding ID of the data, and a third field storing an index corresponding to the second segment of the sequence, wherein the second segment is stored in the auxiliary table;
    the at least one record of the auxiliary table including a first field storing the second segment, a second field storing the index of the second segment, and a third field storing an index of a next segment in the sequence that is stored in the auxiliary table, the third field of the auxiliary table also storing a preceding segment of the sequence that is stored in the auxiliary table; and
    wherein the index in the third field of the main table is identical to the index in the second field of the auxiliary table.

11. The computer system according to claim 10, wherein the auxiliary table further comprises another record storing a third segment of the plurality of segments as a first field, storing an index indicating the third segment as a second field, and storing an index of a next segment of the sequence as a third field thereof.

12. The computer system according to claim 10, wherein the index is a randomly generated unique integer.

* * * * *